Nov. 7, 1933.  W. H. FLUKER  1,934,121
LICENSE TAG
Filed July 18, 1932
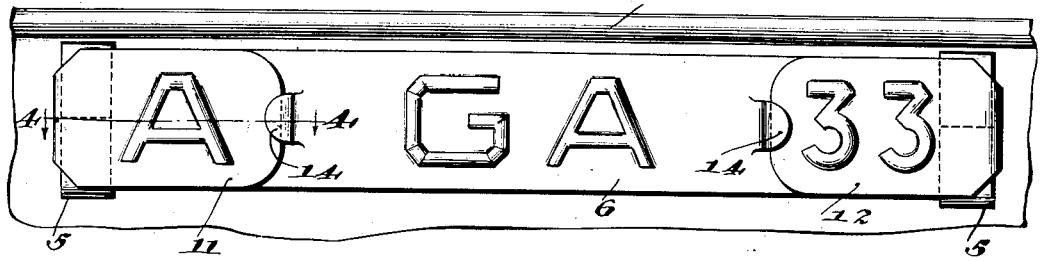
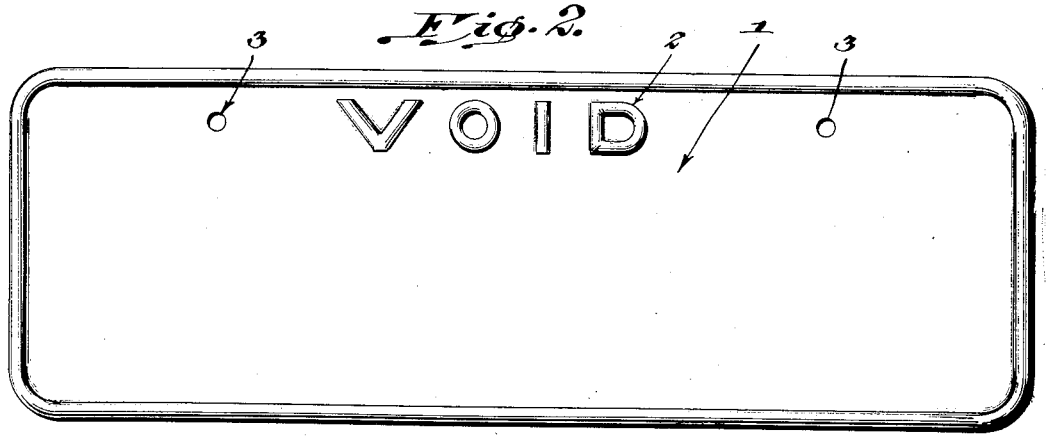
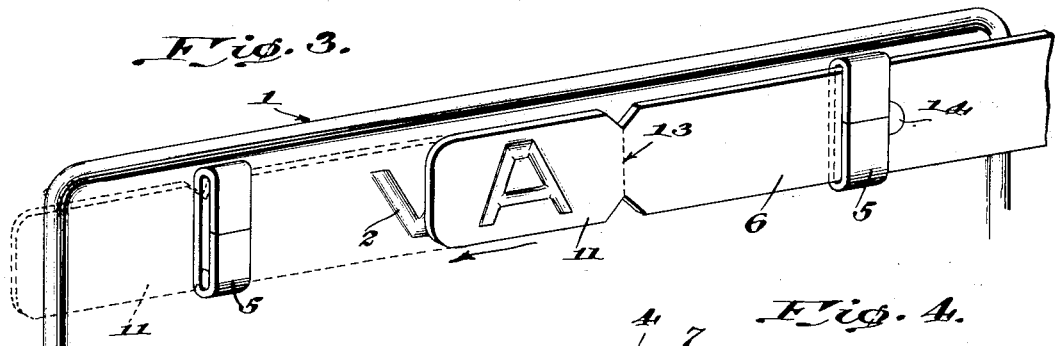
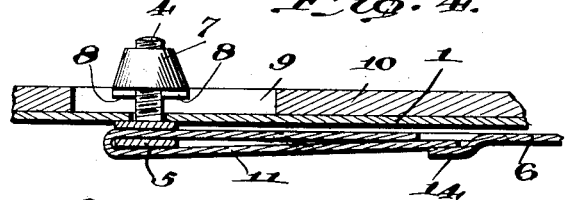
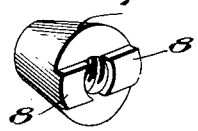
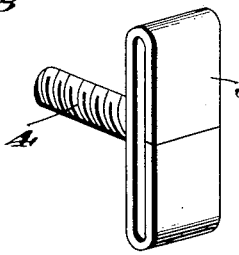
WITNESSES
INVENTOR
William H. Fluker,
BY
ATTORNEY Patented Nov. 7, 1933

1,934,121

UNITED STATES PATENT OFFICE 1,934,121

LICENSE TAG

William H. Fluker, Thomson, Ga.

Application July 18, 1932. Serial No. 623,201

9 Claims. (Cl. 40—125)

This invention relates to improvements in license tags or number plates such as used in connection with motor vehicles, and its objects are as follows:—

First, to provide the fastening devices of a license plate with means to receive a destructible authenticating element, which element is locked in an authenticating position with respect to said means, so as to prevent disconnection of said devices without destroying said element, the purpose of the foregoing arrangements being to deter the premature removal of the license plate.

Second, to utilize the authenticating strip of a license plate as a bolt or other lock positively sealing the license plate on the vehicle.

Third, to provide a pair of fastening devices for securing a license plate to a support, said devices having looped heads through which an authenticating strip is threaded and closed upon itself in a locked position, said strip being of a destructible nature so that an attempt to unlock it with the idea of loosening the fastening devices will cause the destruction of said strip so that the license plate is invalidated.

Fourth, to bring the loop-head of the fastening device and the license plate so closely together as to prevent chiseling off the head without making it manifest to even a casual observer that the license plate has been tampered with.

Fifth, to provide the combination of the fastening device and authenticating strip of a license plate, the fastening devices both supporting the license plate and the authenticating strip, and the authenticating strip guarding the fastening devices against removal for the reason that said authenticating strip has portions which will break off if tampered with thus destroying the authenticity of said strip.

Other objects and advantages will appear in the following specification, reference being had to the accompanying drawing in which Figure 1 is a fractional view of an automobile license plate, illustrating how the authenticating strip is threaded through the loop-headed fastening devices and locked upon itself.

Figure 2 is an elevation of the automobile license plate in its form prior to attachment to the vehicle.

Figure 3 is a detail perspective view illustrating the fastening devices in their ultimate position and showing how the authenticating strip is threaded through prior to being locked upon itself as in Figure 1.

Figure 4 is a cross section taken on the line 4—4 of Figure 2, parts being shown in elevation.

Figure 5 is a perspective view of one of the loop-headed fastening devices.

Figure 6 is a perspective view of the ribbed nut which completes the foregoing fastening device.

The license plate 1 (Fig. 2) is to be regarded as corresponding with any of the known types of license plates such as used in connection with motor vehicles, with the exception that it has the word "Void" printed, embossed or otherwise affixed thereto usually near the upper edge as indicated at 2. This word, or a word to the same effect, occurs in line with a pair of apertures 3 through which the fastening devices are inserted for the purpose of securing the license plate to a support.

Figure 5 illustrates one of the fastening devices which is the particular subject of this application. The fastening device is ordinarily used in pairs. Each fastening device comprises a bolt shank 4 which is threaded in whole or in part as may be required. It has a loop-head 5, or an otherwise apertured head or other formation of a structure that will enable the threading through of an authenticating strip 6 as illustrated in Figure 3.

In the present instance the head 5 is composed of a rather long strip of stiff metal, attached at its approximate mid-section to one end of the shank 4 and then bent around into loop form with the ends abutting. This formation provides a loop or eye through which the authenticating strip is threaded as stated above, and over the outer part of which a portion of the authenticating strip is bent upon itself (Fig. 1) into a locked position.

The bolt shank 4 is inserted in one of the apertures 3 (Fig. 2) and screwed into a nut 7 of the type embraced by the William H. Fluker Patent 1,797,081 of March 17, 1931. The ribs 8 of this nut seat in an aperture or slot 9 of a bracket 10 or other license plate support. The ribs 8 keep the nut from turning while the fastening means is screwed home.

The loop form of the head 5 enables the convenient application of a lever by which the shank 4 can be screwed in very hard. A screw driver will serve very well as the lever. The final position of the two fastening devices should be as depicted in Figure 3. The loop-heads 5 should stand upright and in substantial parallelism so as to form a channel for the authenticating strip.

The strip 6 is of the type disclosed in the

William H. Fluker Patent 1,850,005 of March 15, 1932. In the present instance it comprises the main central body and opposite end tongues 11, 12. The central body and its end have indicia reverse from each other. Ordinarily the body 6 and tongues 11, 12 are in the form of a straight, long strip. After the strip is inserted in the channel defined by the loop-headed fastening means (Fig. 3), the end tongues 11, 12 are bent along weakened places 13 upon the main body and over the outer parts of the heads 5 (Fig. 1). It is then that the indicia on the ends can be read from the same position from which the indicia on the body is readable. The authenticating strip then links the loop-headed fastening devices and covers or conceals the word "Void". The weakened places comprise a frangible construction which will stand only one bending, and that toward the locked position of the tongues 11, 12. A reverse bend will break either tongue off.

Having bent the tongues 11, 12 over (Fig. 1), the free ends are locked by tabs 14. These tabs are stamped from the main body of the strip. After the strip has been threaded through the loop-heads the tabs are pried up so as to receive the ends of the tongues 11, 12 after the foregoing bending over of the latter.

The strip 6 serves the double purpose of authenticating the license plate 1 and locking the bolt shanks 4 to positively seal the license plate on the vehicle. The intention is to use the one license plate year after year. Successive sets of strips 6 will be issued to authenticate the license plate 1 each year. Should the strip be removed prematurely the license plate 1 will become invalidated.

The bending back of the tongues 11, 12 will result in their breakage at the weakened places 13, thus virtually destroying the authenticating strip because of the absence of essential parts which are necessary to its authenticity. Persons knowing of the frangible nature of the strip will be forewarned against an attempt to tamper with the fastening devices 5, 7. It is impossible to turn the bolt shank 4 (Fig. 5) without being able to get hold of the head 5, and the head 5 cannot be gotten hold of for the purpose of turning without removing the authenticating strip.

It is to be noted particularly that in Figure 4 the inner portion of the head 5 bears very closely against the face of the license plate 1. This is due to the hard screwing down mentioned above. The close contact between the loop-head and the license plate makes it impossible to attempt to chisel the head off without making it manifest to the observer that the license plate has been tampered with. This purpose can be furthered by setting the inner portion of the head 5 in a depression in the license plate thus making it virtually impossible to pry under the head.

From what has been stated above it is apparent that there is a direct combination between the fastening devices 5, the authenticating strip 6 and the license plate 1. The fastening devices support both the license plate and the authenticating strip, and the authenticating strip guards against the removal of both the fastening devices and the license plate.

The foregoing description is predicated on the attachment of the fastening devices (Figs. 5 and 6) to the metallic bracket 10 of a motor vehicle. The following modification is to be regarded as within the purview of the invention: Instead of making the bolt shank 4 with a machine screw thread, this shank is to be tapered and provided with a wood screw thread.

In other words, instead of screwing the shank 4 into the nut 7, the principle of the invention will be preserved in every degree if the shank 4 were a wood screw and it were screwed or worked into a wooden support. Of course it is not likely that wooden supports will ever become common on motor vehicles, but sometimes it is necessary to mount a license plate where there is no convenient metallic support.

Such a place would occur at the back of a wooden trailer. The fastening means could be screwed directly into the wood, and after the authenticating strip 6 is threaded through the loop-heads 5, the affixation of the license plate 1 will virtually be as durable as if screwed to a metallic bracket. It would almost be impossible to pull the wood screws out, and certainly it would be impossible to attempt doing this without mutilating the license plate to such an extent as to make that fact apparent to anyone who looks at it.

An extension of this idea suggests itself in the affixation of tags or plates of any sort to a wooden or similar wall, it being a prerequisite to lock such plates in place by a link extending from one fastening device to the other. For example, should it be desired to affix a license plate to a billboard and to authenticate the license plate by means of a specially constructed strip, fastening devices of the wood screw type would be employed and an authenticating strip such as 6 would be threaded through and bent over as already brought out.

I claim:—

1. A license plate having apertures formed therein adapted to register with apertures in a support, fastening devices adapted to be placed in said apertures to secure said plate to said support, an authenticating strip linking said fastening devices, and cooperating means embodied in said strip to lock it in the linking position, said strip having frangible parts causing breakage upon an attempt at its removal after releasing said cooperating means.

2. A license plate having apertures formed therein adapted to register with apertures in the support, fastening devices adapted to be placed in said apertures to secure said plate to said support, said fastening devices forming a channel, an authenticating strip inserted in said channel and including frangibly connected ends bendable over portions of the fastening devices and upon the body of the strip, and means on said strip with which the ends are engageable to establish a locking position.

3. A license plate having apertures formed therein adapted to register with apertures in a support, fastening devices including bolt shanks and nuts adapted to be placed in the apertures of the respective plate and support to secure the plate to said support, said fastening devices also including loop-heads forming a channel, an authenticating strip slidably mounted in said channel, including frangibly connected end tongues bent over portions of said loop-heads and against the body of the strip, and means mounted on the body of the strip to engage the tongues to establish a locking position.

4. A license plate having apertures formed therein adapted to register with apertures in a support, fastening devices adapted to be placed in said apertures to secure said plate to said support, and an authenticating strip linking said fastening devices, said strip having frangible parts bendable in one direction to secure said strip in the linking and authenticating position, said parts breaking off upon a single reverse bend.

5. A license plate having apertures formed therein adapted to register with apertures in a support, fastening devices insertable in said apertures to secure said plate to said support with a turning motion, and an authenticating strip linking said fastening devices to prevent turning motion in the reverse direction, said strip having frangible parts bendable in one direction to secure said strip in the linking and authenticating position, said parts breaking off upon a single reverse bend.

6. A license plate having apertures formed therein adapted to register with apertures in a support, fastening devices insertable in said apertures to secure said plate to said support with a turning motion, an authenticating strip linking said fastening devices to prevent turning motion in the reverse direction, said strip having frangible parts bendable in one direction to secure said strip in the linking and authenticating position, said parts breaking off upon a single reverse bend, and means to fasten said frangible parts down against the strip in their originally bent positions.

7. A license plate having apertures, fastening devices to be inserted through said apertures and worked into a support, said fastening devices having exposed heads of a loop formation, and a strip bearing indicia of a nature to authenticate the license plate, said strip being threaded through said heads and bent into a locking position, the bent parts of said strip being frangible and subject to breaking off upon a reverse bend.

8. A license plate, fastening devices to be inserted through the plate and worked into a support to secure the license plate, an authenticating strip having indicia on one side of its central portion and on the opposite side of at least one of its two ends, and apertured heads on said fastening devices, the authenticating strip extending through the apertures in a spanning position with its central indicia to the front, over which heads the ends are bent to bring the reverse indicia to the front also.

9. A license plate, fastening devices to be inserted through the plate and worked into a support to secure the license plate, an authenticating strip having indicia on one side of its central portion and on the opposite side of at least one of its two ends, apertured heads on said fastening devices, the authenticating strip extending through the apertures in a spanning position with its central indicia to the front, over which heads the ends are bent to bring the reverse indicia to the front also, and a frangible construction joining the ends with the central body being subject to rupture upon a reverse bend of the respective end thus causing said end and its reverse indicia to come off.

WILLIAM H. FLUKER.